(12) United States Patent
Luria et al.

(10) Patent No.: US 10,156,859 B2
(45) Date of Patent: Dec. 18, 2018

(54) LOW DROPOUT VOLTAGE REGULATOR INTEGRATED WITH DIGITAL POWER GATE DRIVER

(71) Applicant: Intel Corporation, Santa Clara, CA (US)

(72) Inventors: Kosta Luria, Pardesiva (IL); Alexander Lyakhov, Haifa (IL); Joseph Shor, Yakum (IL); Michael Zelikson, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/129,860

(22) PCT Filed: Sep. 26, 2013

(86) PCT No.: PCT/US2013/061938
§ 371 (c)(1),
(2) Date: Dec. 27, 2013

(87) PCT Pub. No.: WO2015/047276
PCT Pub. Date: Apr. 2, 2015

(65) Prior Publication Data
US 2016/0202714 A1  Jul. 14, 2016

(51) Int. Cl.
*G06F 1/00* (2006.01)
*G05F 1/56* (2006.01)
(Continued)

(52) U.S. Cl.
CPC ............... *G05F 1/56* (2013.01); *G06F 1/266* (2013.01); *H02M 1/088* (2013.01); *H02M 2001/0045* (2013.01)

(58) Field of Classification Search
CPC ......... H02M 2001/0045; H02M 3/156; H02M 3/158; H02M 2001/0032; G05F 1/56; G05F 1/10
See application file for complete search history.

(56) References Cited

U.S. PATENT DOCUMENTS 6,812,778 B1 * 11/2004 Yeo .......................... G05F 3/267
327/382
9,229,464 B2 * 1/2016 Buescher ................... G05F 1/56
(Continued)

FOREIGN PATENT DOCUMENTS

CN        102096434        6/2011
JP        2009-277233       11/2009
WO       WO-2006061704 A1    6/2006

OTHER PUBLICATIONS

International Search Report and the Written Opinion of the International Searching Authority for International Application No. PCT/US2013/061938, dated Jul. 16, 2014, 7 pages.
(Continued)

*Primary Examiner* — Thomas Lee
*Assistant Examiner* — Zhipeng Wang
(74) *Attorney, Agent, or Firm* — Green, Howard & Mughal LLP

(57) ABSTRACT

Described is an apparatus which comprises: a first power supply node to supply input power supply; a power transistor coupled to the first power supply node; a multiplexer to selectively control gate terminal of the power transistor according to whether the power transistor is to operate as part of a low dropout voltage regulator (LDO-VR) or is to operate as a digital switch; and a second power supply node coupled to the power transistor, the second power supply node to provide power supply to a load from the power transistor.

18 Claims, 7 Drawing Sheets

(51) Int. Cl.
*G06F 1/26* (2006.01)
*H02M 1/088* (2006.01)
*H02M 1/00* (2006.01)

(56) References Cited

U.S. PATENT DOCUMENTS

| | | | |
|---|---|---|---|
| 2006/0087303 A1* | 4/2006 | Hartular | H02M 3/156 323/283 |
| 2006/0123183 A1 | 6/2006 | Koivisto et al. | |
| 2007/0159146 A1* | 7/2007 | Mandal | G05F 1/575 323/280 |
| 2009/0085607 A1* | 4/2009 | Zelikson | H01L 27/0222 326/83 |
| 2009/0322295 A1 | 12/2009 | Scoones et al. | |
| 2010/0026260 A1* | 2/2010 | Xu | H02M 3/156 323/283 |
| 2010/0039082 A1 | 2/2010 | Xie et al. | |
| 2010/0109435 A1* | 5/2010 | Ahmadi | G05F 1/577 307/31 |
| 2011/0018593 A1 | 1/2011 | Williams | |
| 2013/0062962 A1* | 3/2013 | Xue | H02J 5/005 307/104 |
| 2014/0111169 A1* | 4/2014 | Polarouthu | H02M 3/156 323/271 |
| 2015/0035505 A1* | 2/2015 | Peluso | G05F 1/575 323/273 |
| 2015/0035507 A1* | 2/2015 | Cowley | G05F 1/46 323/282 |
| 2015/0042295 A1* | 2/2015 | Cowley | H02M 3/158 323/269 |
| 2015/0077076 A1* | 3/2015 | Bhattad | G05F 1/56 323/280 |

OTHER PUBLICATIONS

Notification Concerning Transmittal of International Preliminary Report on Patentability of the International Searching Authority issued for International Patent Application No. PCT/US2013/061938, dated Apr. 7, 2016.
Notice of Allowance for Chinese Patent Application No. 201380079147.8, dated May 28, 2018.
Notice of Allowance for Korean Patent Application No. 10-2016-7002829, dated Sep. 28, 2017.
Second Office Action for Chinese Patent Application No. 201380079147.8, dated Dec. 26, 2017.

* cited by examiner

LOW DROPOUT VOLTAGE REGULATOR INTEGRATED WITH DIGITAL POWER GATE DRIVER

CLAIM OF PRIORITY

This application claims the benefit of priority of International Patent Application No. PCT/US2013/061938 filed Sep. 26, 2013, titled "Low DROPOUT VOLTAGE REGULATOR INTEGRATED WITH DIGITAL POWER GATE DRIVER," which is incorporated by reference in its entirety.

BACKGROUND

Power gates are used in processors to control power to logic areas. For example, a power gate is used to turn off a logic area if it is determined that the processor is entering a low power mode (e.g., sleep mode), and to keep it on during normal operation. Voltage regulators, separate from power gates, are used to provide regulated power supply to the power gate for being selectively provided to logic areas. To reduce aging effects on the power gates, power gate transistors are enabled in a round robin fashion so that aging process is distributed over a number of power gates over time. Such scheme may use large areas for additional power gate transistors to be enabled in the round robin fashion. Known power gates and voltage regulators consume large areas and power.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
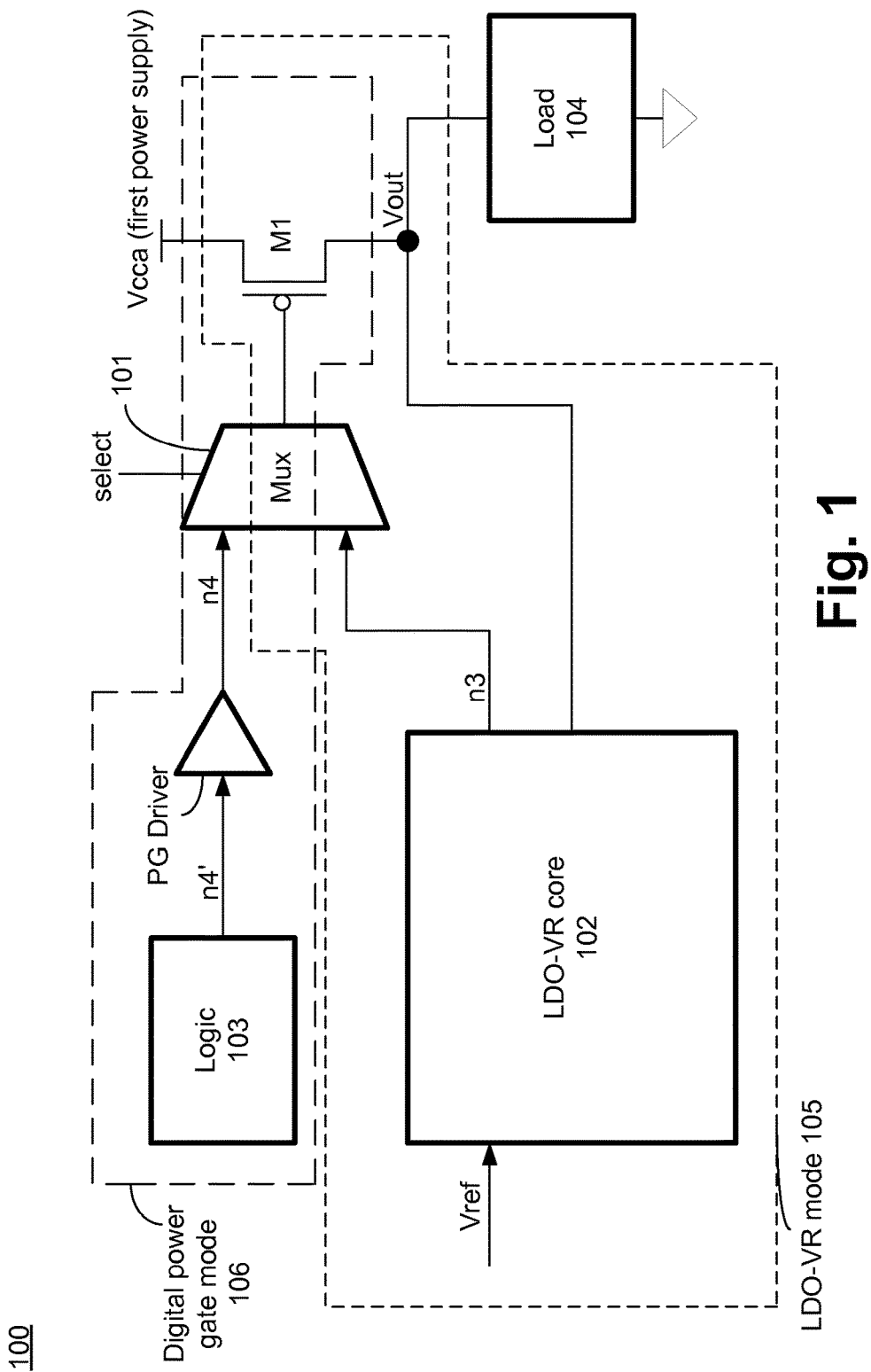
FIG. 1 illustrates architecture with a power gate for dual use as part of low dropout voltage regulator (LDO-VR) and digital driver, according to one embodiment of the disclosure.

The embodiments describe a dual use of a digital power gate both as an on-off driver and linear analog driver. In one embodiment, the linear analog driver is implemented as a low dropout voltage regulator (LDO-VR). In one embodiment, the LDO-VR is implemented with a flipped source follower such that all of the compensation is performed on-chip. The embodiments use substantially less area compared to power gate drivers that use the round robin rotation scheme. Other technical effects will be evident from the embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal or data/clock signal. The meaning of "a," "an," and "the" include plural references. The meaning of "in" includes "in" and "on."

The term "scaling" generally refers to converting a design (schematic and layout) from one process technology to another process technology. The term "scaling" generally also refers to downsizing layout and devices within the same technology node. The term "scaling" may also refer to adjusting (e.g., slow down) of a signal frequency relative to another parameter, for example, power supply level. The terms "substantially," "close," "approximately," "near," and "about," generally refer to being within +/−20% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors are metal oxide semiconductor (MOS) transistors, which include drain, source, gate, and bulk terminals. The transistors also include Tri-Gate and FinFet transistors, Gate All Around Cylindrical Transistors or other devices implementing transistor functionality like carbon nano tubes or spintronic devices. Source and drain terminals may be identical terminals and are interchangeably used herein. Those skilled in the art will appreciate that other transistors, for example, Bi-polar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

FIG. 1 illustrates architecture 100 with a power gate for dual use as part of low dropout voltage regulator (LDO-VR) and digital driver, according to one embodiment of the disclosure. In one embodiment, architecture 100 comprises multiplexer (mux) 101, p-type power transistor M1, LDO-VR core 102, logic 103, buffer, and load 104.

In one embodiment, M1 has a dual purpose or modes. For example, in a first mode M1 is used as a traditional power gate transistor when mux 101 selects signal on node n4 to control gate terminal of M1, and in a second mode M1 is used as part of linear voltage regulation when mux 101 selects signal on node n3 to couple to the gate terminal of M1. The former is referred to as digital power gate mode 106 and the later is referred to as the LDO-VR mode 105. In one embodiment, source terminal of M1 is coupled to first power supply (Vcca) and the drain terminal of M1 is coupled to Vout. The first power supply is also referred to as the un-gated power supply.

In one embodiment, Vout is coupled to LDO-VR core 102 and to load 104. In one embodiment, load 104 is any logic sub-section. For example, load 104 is a processor core, section of a processor core, input/output buffer(s), cache, etc. In one embodiment, LDO-VR core 102 also operates on first power supply. In one embodiment, LDO-VR core 102 in conjunction with M1 is implemented as flipped source follower. In other embodiments, other architectures of LDO-VR core 102 may be used. In one embodiment, LDO-VR core 102 receives reference voltage Vref and compares it with output voltage Vout to adjust signal on node n3. Here, the term signal and node on that signal are interchangeably used. For example, Vout is referred to both signal Vout and node Vout depending on the context of the sentence.

In one embodiment, during digital gate mode 106, digital signal generated by logic 103 is used to control gate terminal of M1. In one embodiment, output of logic 103 is buffered by the buffer. In one embodiment, buffer receives input on node n4' and generates an output on node n4. The buffer is also referred to as the power gate driver. In one embodiment, gate terminal of M1 (i.e., power gate) is controlled by buffer such that the gate terminal of M1 is gradually switched from off state to on state to avoid voltage droops on the un-gated power supply.

While the embodiments illustrate a single power transistor M1, multiple power transistors are coupled together in parallel. In one embodiment, node n4 is a bus to carry multiple signals for controlling different power transistors M1.

In one embodiment, M1 transistors are grouped in two sub-groups. In one embodiment, a first sub-group of M1 transistors are digitally controlled and the other sub-group of M1 transistors are controlled by LDO-VR core 102. In such an embodiment, mux 101 can be removed.

Figure 2:
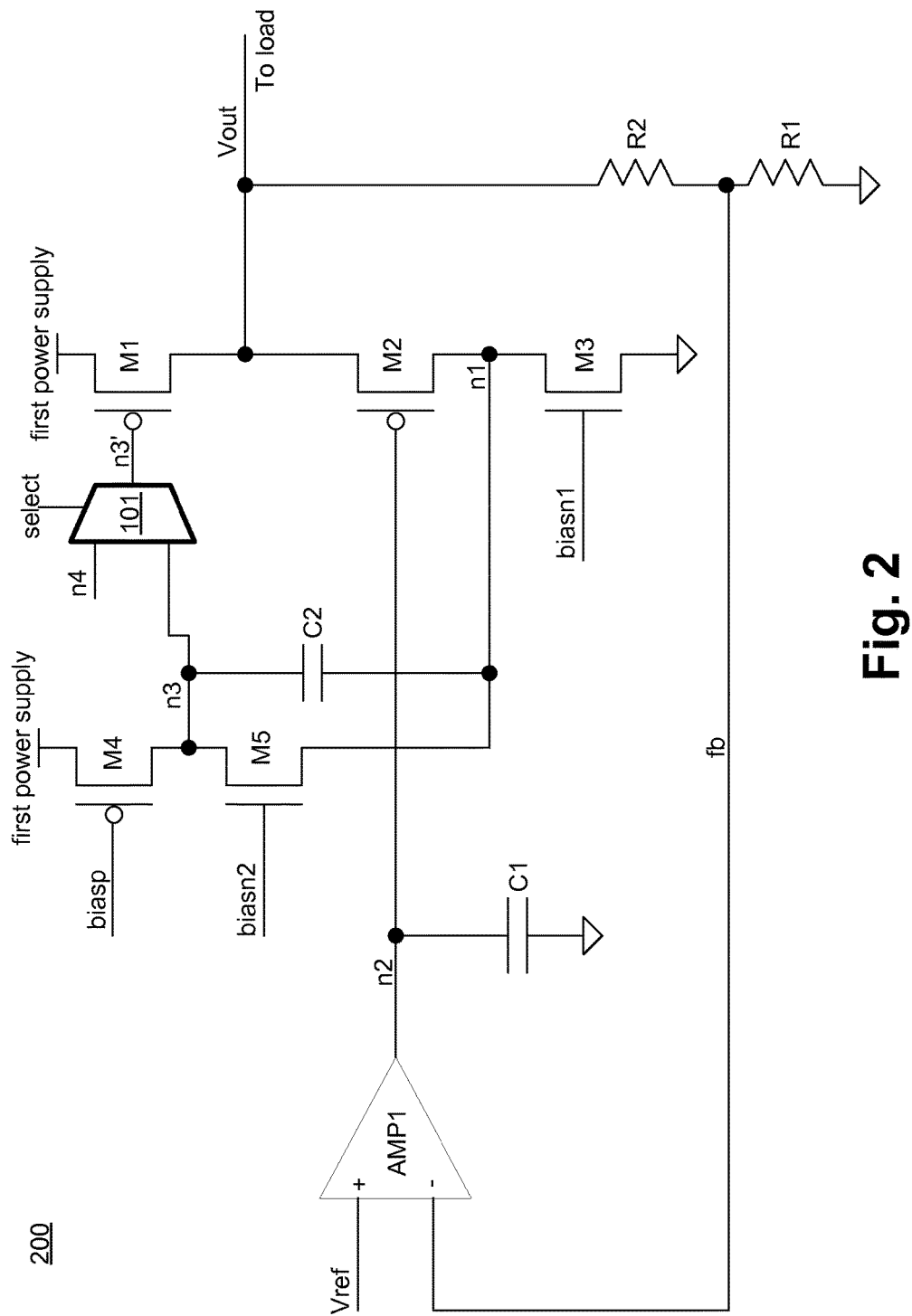
FIG. 2 illustrates a circuit level architecture with a power gate for dual use as part of a LDO-VR and a digital driver, according to one embodiment of the disclosure.

FIG. 2 illustrates a circuit level architecture 200 with a power gate for dual use as part of an LDO-VR and a digital driver, according to one embodiment of the disclosure. It is pointed out that those elements of FIG. 2 having the same reference numbers (or names) as the elements of any other figure can operate or function in any manner similar to that described, but are not limited to such.

In one embodiment, architecture 200 comprises amplifier or comparator AMP1, p-type transistor M1, p-type transistor M2, n-type transistor M3, p-type transistor M4, and n-type transistor M5, resistors R1, and R2, capacitors C1 and C2. In one embodiment, resistors R1 and R2, and capacitors C1 and C2 are optional devices. Any number of implementations may be used for the capacitors that are added to provide stability to the design. In one embodiment, the effect of capacitor C1 is implemented as a lead network with capacitors and resistors.

In one embodiment, AMP1 receives inputs Vref (which carries reference voltage) and feedback node fb. In one embodiment, AMP1 is a single stage amplifier/comparator. In other embodiments, multiple stages may be used to implement AMP1. In one embodiment, fb is a voltage which is divided down version of Vout (output voltage to load). In one embodiment, fb is generated by resistors R1 and R2.

In one embodiment, resistor R2 has one terminal coupled to Vout and another terminal coupled to node fb. In one embodiment, resistor R1 is coupled in series with resistor R2. In one embodiment, one terminal of resistor R1 is coupled to second terminal of resistor R2 (and to node fb) and the other terminal of resistor R1 is coupled to ground. In one embodiment, output of AMP1 is node n2 which is coupled to gate terminal of M2. In one embodiment, capacitor C1 is coupled to node n2 and ground. In one embodiment, AMP1 compares Vref with fb to generate signal on node n2 to control current through M2. In one embodiment, AMP1 continues to adjust signal on node n2 until Vref is substantially equal to voltage on fb.

In one embodiment, M1 is the power transistor which drives load 104 coupled to Vout. In one embodiment, drain terminal of M1 is coupled to first power supply, source terminal of M1 is coupled to Vout, and gate terminal is coupled to output n3' of mux 101. In one embodiment, M2 has a gate terminal coupled to node n2, source terminal coupled to Vout, and drain terminal coupled to n1 and to drain terminal of M3. In one embodiment, source terminal of M3 is coupled to ground. In one embodiment, M3 is a current source controlled by biasn1. In one embodiment, biasn1 and other bias voltage (i.e., biasp and biasn2) are generated by one or more known bias circuits (not shown).

In one embodiment, M4 (which is a current source) has a source terminal coupled to first power supply, drain terminal coupled to node n3, and to drain terminal of M5. In one embodiment, gate terminal of M4 is controlled by bias biasp. In one embodiment, compensation capacitor C2 is coupled between nodes n3 and n1. Any number of implementations may be used for the capacitor(s) that are added to provide stability to the design. In one embodiment, the effect of capacitor C2 is implemented as a lead network with capacitors and resistors. In one embodiment, node n3 is coupled to an input of mux 101. In one embodiment, the other input of 101 is coupled to node n4. In one embodiment, mux 101 is a pass-gate based mux. In one embodiment, mux 101 is controllable by select signal. In one embodiment, source terminal of M5 is coupled to node n1, drain terminal of M5 is coupled to node n3, and gate terminal of M5 is controllable by biasn2.

In one embodiment, resistors R1 and R2 are of the same resistance. In one embodiment, R1 and R2 may be of different resistances. In one embodiment, resistors R1 and R2 are transistor based resistors. In one embodiment, resistors R1 and R2 are process resistors (e.g., ploy resistors). In one embodiment, a combination of transistors and process resistors may be used to implement resistors R1 and R2. In one embodiment, capacitors C1 and C2 are process capacitors (e.g., metal capacitors). In one embodiment, capacitors C1 and C2 are transistor based capacitors. In one embodiment, hybrid capacitors formed from a combination of processor capacitors and transistor capacitors are used to implement capacitors C1 and C2. Any number of implementations may be used for the capacitors that are added to provide stability to the design. In one embodiment, the effect of capacitor C1 is implemented as a lead network with capacitors and resistors.

In one embodiment, M1, M2, M3, M4, and M5 form a flipped source follower. In one embodiment, M3 and M4 form current sources to provide high gain. In one embodiment, M5 is a cascode device. In one embodiment, node n3 is a high impedance node. In one embodiment, the flipped source follower has a slow loop which includes resistors R2 and R1, AMP1 (also called error amplifier) and capacitor C1. In one embodiment the flipped source follower has a fast loop (i.e., faster in settling time compared to the slow loop) which includes loop formed from transistors M1-M5 and mux 101. In one embodiment, mux 101 is not needed to implement the flipped source follower. In one embodiment, DC (direct current) level of Vout is determined by the slow loop. In one embodiment, the AC (alternating current) or high frequency characteristics of architecture 200 and signal Vout are dominated by the fast loop. In one embodiment, fast loop provides high frequency response while slow loop provides low frequency or DC response.

In one embodiment, at DC, the gate of M2 is biased by Vout-Vt and some overdrive voltage defined by the operation point and transistor parameters, where Vt is the threshold voltage of M2. In one embodiment, when Vout changes in an AC event (e.g., due to current demand change by load 104), the Vgs (gate to source voltage) and hence current of M2 changes. In such an embodiment, M2 current is folded back to node n3 which changes the bias of M1 to correct the AC change at Vout. In one embodiment, the fast loop is an AC gain stage which is compensated by capacitor C2. In other embodiments, capacitor C2 may be coupled to other nodes.

Figure 3A:
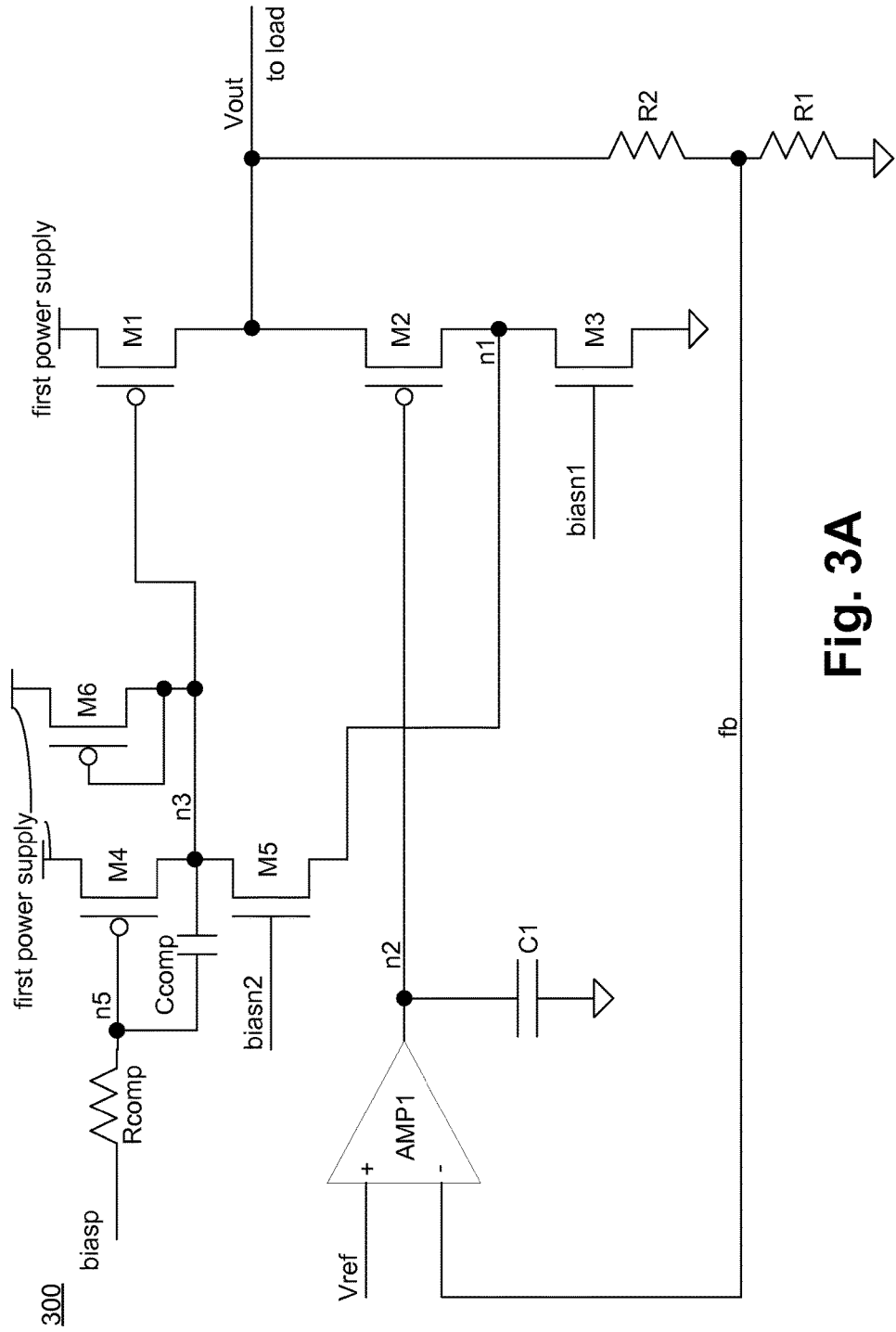
FIG. 3A illustrates a circuit level architecture of an LDO-VR with pole tracking mechanism, according to one embodiment of the disclosure.

FIG. 3A illustrates a circuit level architecture 300 of an LDO-VR with pole tracking mechanism (or pole movement compensation), according to one embodiment of the disclosure. It is pointed out that those elements of FIG. 3A having the same reference numbers (or names) as the elements of any other figure can operate or function in any manner similar to that described, but are not limited to such. FIG. 3A is described with reference to FIG. 2. So as not to obscure the embodiments, differences between FIG. 2 and FIG. 3A are described and components/devices and connections previously discussed and repeated in FIG. 3A are not elaborated again.

In this embodiment, mux 101 is removed. In one embodiment, compensation capacitor C2 is removed because a different compensation technique is used. In on embodiment, architecture 300 comprises a diode connected p-type transistor M6. In one embodiment, gate terminal of M6 is coupled to drain terminal of M6 which is coupled to node n3. In this embodiment, node n3 is coupled to the gate terminal of M1. In this embodiment, source terminal of M6 is coupled to first power supply.

Architecture 300 may function at very large operating range of current (e.g., 0.1-8 A). The output pole on Vout may change over several orders of magnitude as current demand by load 104 changes. In one embodiment, M6 functions as a gain limiter for high currents. In one embodiment, M6 compensates for gain variations but also for the pole movement. In one embodiment, as current through M1 increases, the output pole moves to higher frequency. In one embodiment, the mirror-like M6 moves the pole on node n3 to a higher frequency. This pole can be expressed as Cg of M1 times 1/gm of M6. At high LDO currents through M1, the gm (trans-conductance) of M1 is very high, which raises the AC gain of the output stage. In one embodiment, M6 limits the AC gain of the output stage. In one embodiment, M6 is a mirror of the output current. In one embodiment, at low load currents the effect of M6 is negligible. In such an embodiment, at higher currents, M6 kicks in and compensates for the increased AC gain of M1 (i.e., output stage).

In one embodiment, architecture 300 comprises a compensation network having capacitor Ccomp (e.g., 15 pF) and resistor Rcomp (e.g., 30 KOhms). In one embodiment, capacitor Comp is coupled to node n3 and node n5, which is coupled to gate terminal of M4. In one embodiment, resistor Rcomp is coupled to node n5 and biasp. In one embodiment, frequency compensation is provided by Rcomp and Ccomp. In one embodiment resistor Rcomp isolates biasp to M5 in AC. In one embodiment, at some frequency the output impedance of M4 is reduced since the capacitor Ccomp shunts the gate and drain terminals of M4, thus creating a pole. In this embodiment, a zero appears at the 3 dB frequency of Rcomp*Ccomp network, turning M1 into a 1/gm stage. In this embodiment, the compensation network appears as a pole and zero on the Bode plot. In such an embodiment, Rcomp and Ccomp appear like a capacitive multiplier.

Figure 3B:
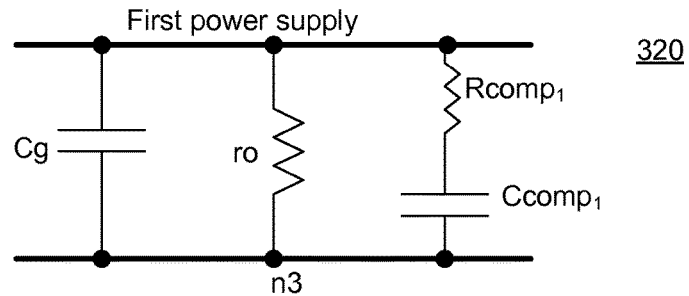
FIGS. 3B-D illustrate compensation networks according to one embodiment of the disclosure.
Figure 3C:
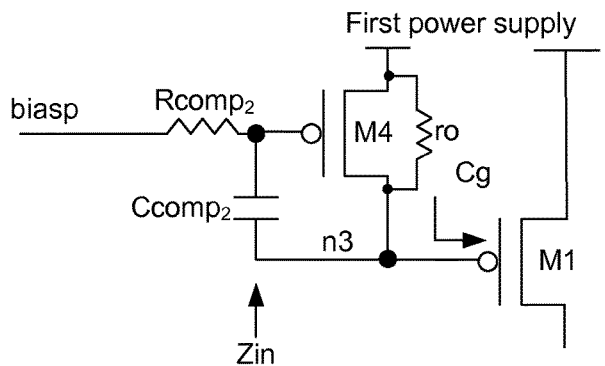
Figure 3D:
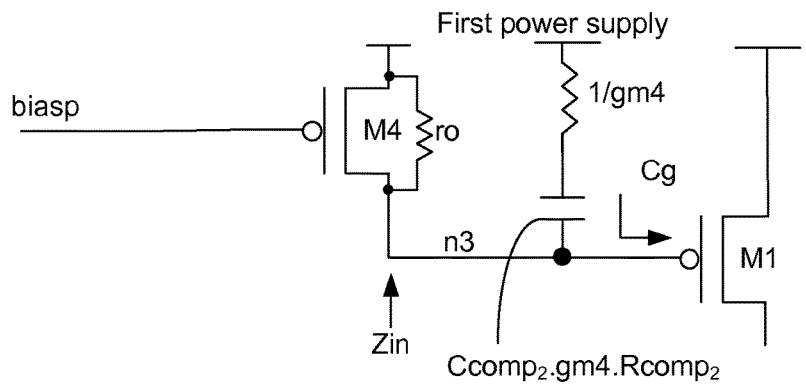

FIGS. 3B-D illustrate compensation networks 320, 330, and 340 respectively, according to one embodiment of the disclosure. It is pointed out that those elements of FIG. 3B-D having the same reference numbers (or names) as the elements of any other figure can operate or function in any manner similar to that described, but are not limited to such.

Here, Cg is gate capacitance of M1 and ro is the output impedance of M4. In one embodiment, for better LDO-VR performance larger ro is used and for high current capacity larger Cg is used. In such a case, a low frequency pole appears in the fast loop. Here, the impedance of n3 is given as:

$$Z_{in} = \frac{r_o}{sr_oC_g + 1}$$

In one embodiment, compensation network 320 comprises capacitor $Ccomp_1$ and resistor $Rcomp_1$ coupled together in series. The low frequency pole (i.e., Vout low frequency pole or any other low frequency pole in the loop) may be cancelled or reduced by lag compensation i.e., by addition of $Rcomp_1$ and $Ccomp_1$. In one embodiment, capacitor $Ccomp_1$ is several times larger than Cg. In one embodiment, compensation resistor $Rcomp_1$ is several times smaller than ro. In one embodiment, with the compensation network, input impedance is expressed as:

$$Z_{in} \cong \frac{r_o}{sr_oC_g\left(\frac{C_{comp1}}{C_g} + 1\right) + 1} \cdot \frac{sR_{comp1}C_{comp1} + 1}{sr_oC_g\left(\frac{1}{\frac{r_o}{R_{comp1}} + 1}\right) + 1}$$

which can be simplified as:

$$Z_{in} \cong \frac{r_o}{sr_oC_{comp1} + 1} \cdot \frac{sR_{comp1}C_{comp1} + 1}{sR_{comp1}C_g + 1}$$

The size of $Ccomp_1$ is very large (e.g., 90 nF) in size, and may be implemented as a discrete capacitor.

In one embodiment, compensation network 330 is used in architecture 300. In this embodiment, M4 is used as a current source and for capacitive multiplication with zero power penalty. In this embodiment, Ccomp$_2$ is much smaller in size than Ccomp$_1$ e.g., about 1000 smaller in size. The small size of Ccomp$_2$ allows it to be implemented on die. The capacitive multiplication effect is shown in FIG. 3D. Here, compensation network 340 is an equivalent compensation network to network 330. Network 340 provides similar compensation as network 320, but with much smaller compensation capacitor. Here, the compensation capacitance is given by Ccomp$_2$*gm4*Rcomp$_2$ which is a large capacitance caused by multiplication effect, and compensation resistance is given by 1/gm4. In this embodiment, the input impedance of the compensation network 330 can be expressed as:

$$Z_{in} \cong \frac{r_o}{sr_o C_{comp2}(R_{comp2} \cdot gm_4 + 1) + 1} \cdot \frac{1 + sC_{comp2}R_{comp2}}{sC_g \frac{1}{gm_4} + 1}$$

where gm4 is the trans-conductance of M4. Compensation network 330 is smaller than compensation network 320. In this embodiment, M4 sets the operation point of LCO-VRs fast loop. In one embodiment, M4 provides active compensation with capacitance multiplication.

Figure 4:
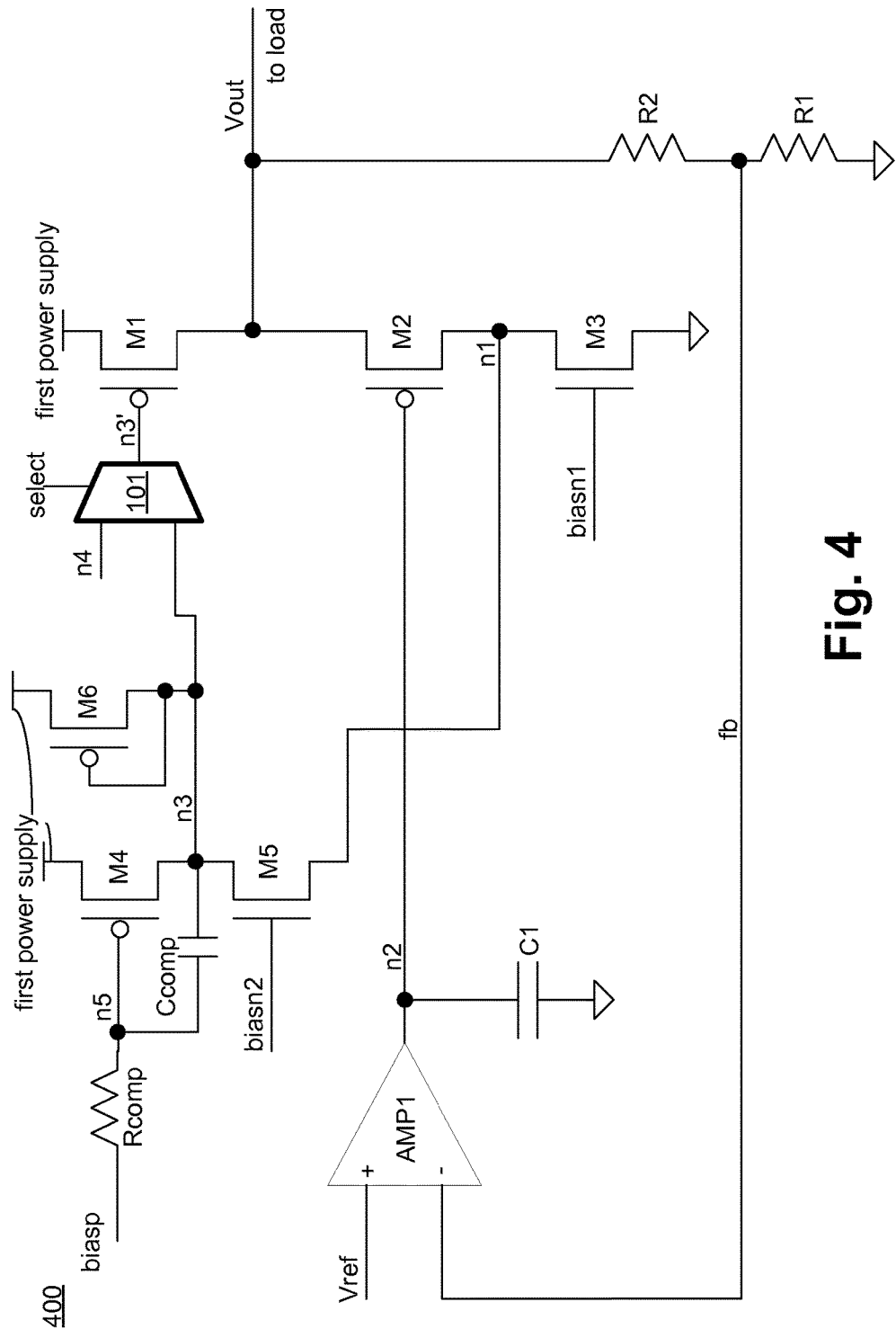
FIG. 4 illustrates a circuit level architecture with a power gate for dual use as part of an LDO-VR pole tracking mechanism and capacitive multiplication compensation network, and a digital driver, according to one embodiment of the disclosure.

FIG. 4 illustrates a circuit level architecture 400 with a power gate for dual use as part of a LDO-VR with phase tracking mechanism and capacitive multiplication compensation network, and a digital driver, according to one embodiment of the disclosure. It is pointed out that those elements of FIG. 4 having the same reference numbers (or names) as the elements of any other figure can operate or function in any manner similar to that described, but are not limited to such. FIG. 4 is described with reference to FIG. 3A. So as not to obscure the embodiments, differences between FIG. 4 and FIG. 3A are described and components/devices and connections previously discussed and repeated in FIG. 3A are not elaborated again.

In this embodiment, architecture 400 includes mux 101 coupled between nodes n3 and n3', where node n3' is coupled to the gate terminal of M1. In one embodiment, n4 is coupled to a second input of mux 101 while n3 is coupled to a first input of mux 101. In one embodiment, mux 101 is controlled by select signal. In the embodiment of architecture 400, mux 101, diode connected M6, and smaller compensation network 330 are used in addition to the previously discussed components.

Figure 5:
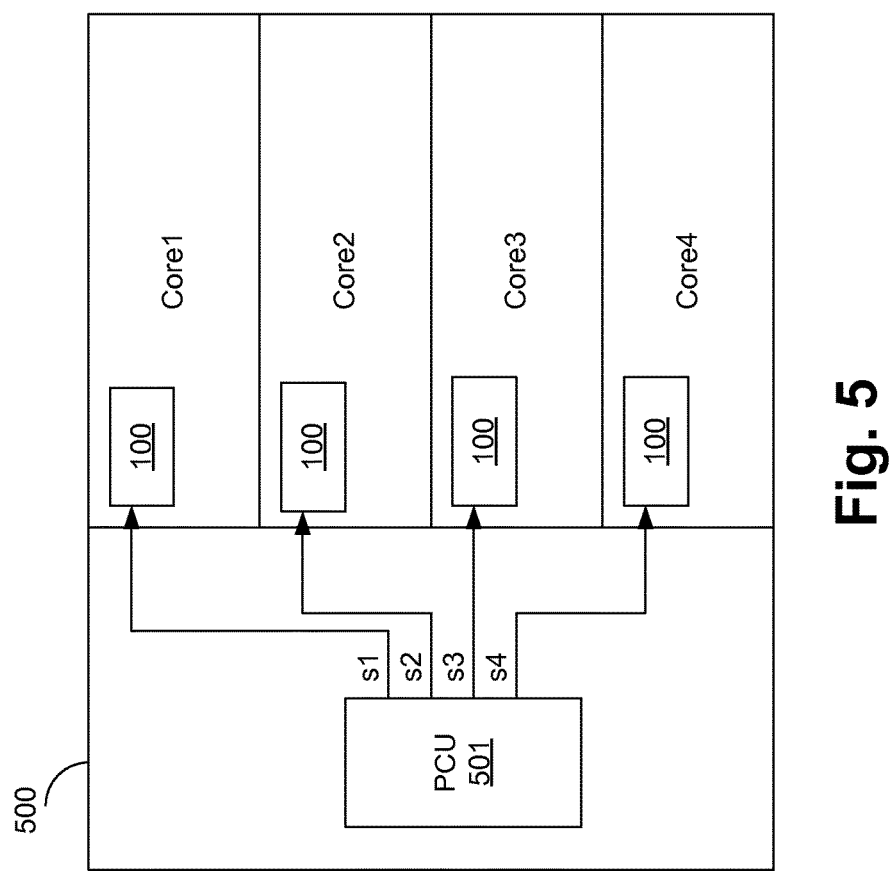
FIG. 5 is a processor with multiple cores, each of which having the architecture with a power gate for dual use as part of an LDO-VR and a digital driver, according to one embodiment.

FIG. 5 is a processor 500 with multiple cores, each of which having the architecture with a power gate for dual use as part of a LDO-VR and a digital driver, according to one embodiment. It is pointed out that those elements of FIG. 5 having the same reference numbers (or names) as the elements of any other figure can operate or function in any manner similar to that described, but are not limited to such.

In one embodiment, processor 500 comprises multiple cores—cores1-4—power control unit 501 (PCU), and multiple circuits 100 with a power gate for dual use as part of LDO-VR and digital driver. In one embodiment, PCU 501 generates control signals s1-s4 for each circuit 100 (from FIG. 1, and also any one of FIGS. 2-4) in each core. In one embodiment, signals s1-s4 may be a bus having information about the select signals for mux 101, control signals for logic 103, and other signals. In this embodiment, cores 1-4 or subsections of cores 1-4 are the loads for each circuit 100.

While the embodiment of FIG. 5 illustrates four cores, any number of cores may be used with any arrangement and support of circuits 100.

Figure 6:
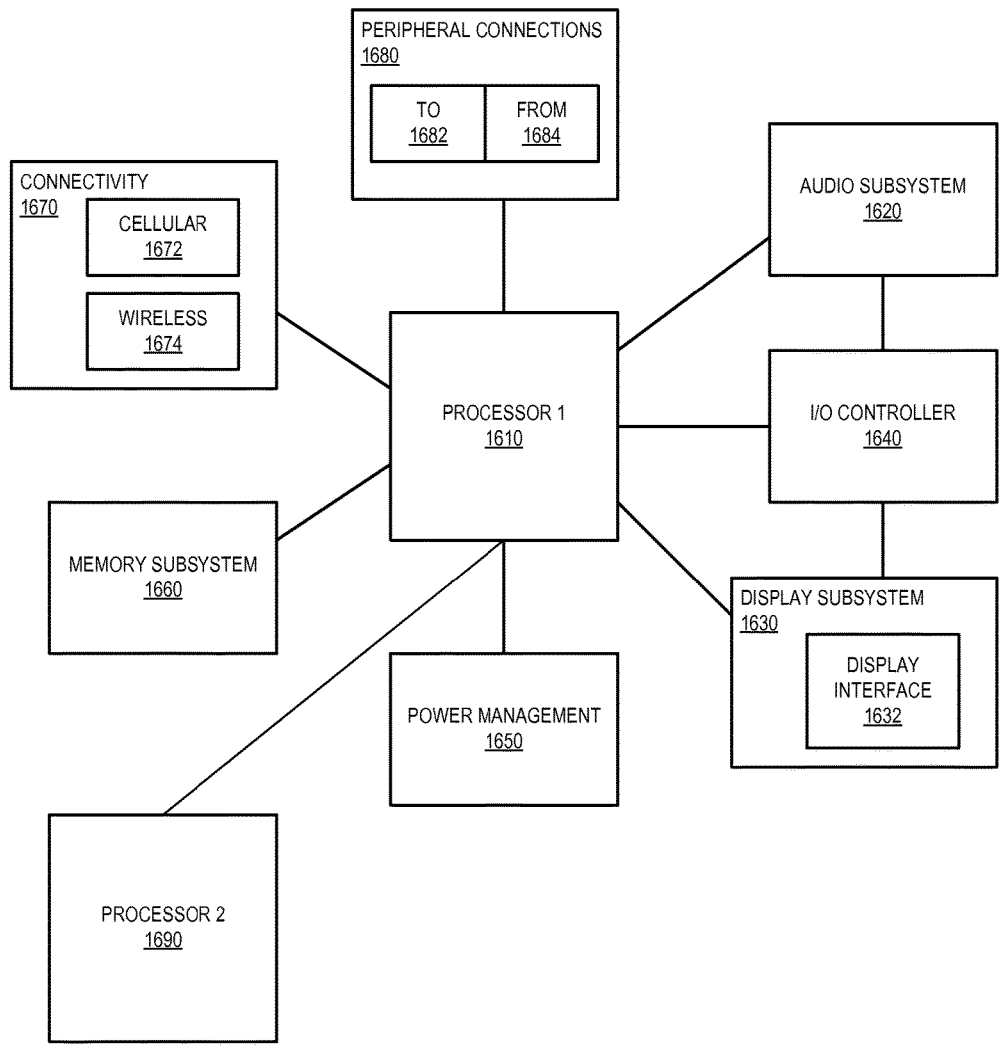
FIG. 6 is a smart device or a computer system or an SoC (system-on-chip) with a power gate for dual use as part of an LDO-VR and a digital driver, according to one embodiment of the disclosure.

FIG. 6 is a smart device or a computer system or an SoC (system-on-chip) 1600 with a power gate for dual use as part of a LDO-VR and a digital driver, according to one embodiment of the disclosure. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In one embodiment, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In one embodiment, computing device 1600 includes a first processor 1610 with a power gate for dual use as part of a LDO-VR and a digital driver described with reference to embodiments discussed. Other blocks of the computing device 1600 may also include apparatus of with a power gate for dual use as part of a LDO-VR and a digital driver described with reference to embodiments. The various embodiments of the present disclosure may also comprise a network interface within 1670 such as a wireless interface so that a system embodiment may be incorporated into a wireless device, for example, cell phone or personal digital assistant or a wearable device.

In one embodiment, processor 1610 (and/or processor 1690) can include one or more physical devices, such as microprocessors, application processors, microcontrollers, programmable logic devices, or other processing means. Processor 1690 may be optional. While the embodiment shows two processors, a single or more than two processors may be used. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In one embodiment, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In one embodiment, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In one embodiment, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, in one embodiment, an apparatus is provided which comprises: a first power supply node to supply input power supply; a power transistor coupled to the first power supply node; a multiplexer to selectively control gate terminal of the power transistor according to whether the power transistor is to operate as part of a low dropout voltage regulator (LDO-VR) or is to operate as a digital switch; and a second power supply node coupled to the power transistor to provide power supply to a load from the power transistor.

In one embodiment, the LDO-VR is of a flipped source follower type. In one embodiment, the LDO-VR comprises a diode connected transistor coupled to the first power supply node and another node. In one embodiment, the other node is coupled to the gate terminal of the power transistor via the multiplexer. In one embodiment, the LDO-VR comprises a capacitive multiplication compensation network coupled to the other node. In one embodiment, the diode to compensate pole movement during current demand change on the second power supply node.

In one embodiment, the LDO-VR comprises: a first p-type transistor with a source terminal coupled to the second power supply node; and an amplifier or comparator to compare a reference with a divided down voltage on the second power supply node, the amplifier or comparator having an output to control gate terminal of the p-type transistor. In one embodiment, the LDO-VR further comprises: a first n-type transistor coupled in series with the first p-type transistor, the first n-type transistor having a gate terminal controllable by a first bias voltage; and a second n-type transistor coupled to drain terminals of the first p-type transistor and the first n-type transistor, the second n-type transistor having a gate terminal controllable by a second bias voltage.

In one embodiment, the LDO-VR further comprises: a resistor with a first terminal to receive a third bias voltage, and a second terminal; a capacitor with a first terminal coupled to the second terminal of the resistor, the capacitor having a second terminal coupled to the other node which is coupled to the gate terminal of the power transistor via the multiplexer; and a second p-type transistor coupled in series with the second n-type transistor, the second p-type transistor having a gate terminal coupled to the second terminal of the resistor and the first terminal of the capacitor. In one embodiment, the power transistor is a p-type transistor.

In another example, a system is provided which comprises: a memory unit; a processor coupled to the memory unit, the processor having an apparatus according to the apparatus discussed above; and a wireless interface for communicatively coupling the processor to another device.

In another example, an apparatus is provided which comprises: a power transistor to selectively operate as a digital power gate or as part of a low dropout voltage regulator (LDO-VR). In one embodiment, the LDO-VR is a flipped source follower type. In one embodiment, the power transistor is a p-type transistor. In one embodiment, the LDO-VR comprises a diode connected transistor to selectively couple to the power transistor. In one embodiment, the diode connected transistor to stabilize the LDO-VR at high current loads.

In one embodiment, the diode connected transistor is a p-type transistor. In one embodiment, the LDO-VR comprises a capacitive multiplication compensation network to selectively couple to the power transistor. In one embodiment, the power transistor includes: a gate terminal coupled to a multiplexer; a source terminal coupled to a first power supply node; and a drain terminal coupled to a second power supply node, the second power supply node for providing power to a load.

In another example, a system is provided which comprises: a memory unit; a processor coupled to the memory unit, the processor having an apparatus according to apparatus discussed above; and a wireless interface for communicatively coupling the processor to another device. In one embodiment, the system further comprises a display unit for displaying content processed by the processor.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a first power supply node to supply input power supply;
a power transistor coupled to the first power supply node;
a multiplexer to selectively control a gate terminal of the power transistor according to whether the power transistor is to operate as a linear analog driver of a low dropout voltage regulator (LDO-VR) or is to operate as a digital switch,
a first signal node coupled to a first input of the multiplexer to provide a first signal to control the power transistor to operate as the LDO-VR, wherein the multiplexer has a second input to receive a second signal on a second signal node to control the power transistor to operate as the digital switch; and
a second power supply node coupled to the power transistor to provide a power supply to a load from the power transistor, wherein the LDO-VR is a flipped source follower, wherein the LDO-VR comprises a capacitive multiplication compensation network that includes a capacitor coupled to the first signal node to selectively couple to the power transistor, wherein the capacitive multiplication compensation network has a capacitance caused by capacitance multiplication effect.

2. The apparatus of claim 1, wherein the LDO-VR comprises a diode connected transistor coupled to the first power supply node and the first signal node.

3. The apparatus of claim 2, wherein the first signal node is coupled to the gate terminal of the power transistor via the multiplexer.

4. The apparatus of claim 1, wherein the capacitive multiplication compensation network includes a resistor coupled to the capacitor, wherein the LDO-VR comprises a first p-type transistor comprising a first terminal coupled to the first power supply, a second terminal coupled to the first signal node and a gate terminal coupled to the resistor, and wherein the LDO-VR comprises a second p-type transistor that has a first terminal coupled to the first power supply and a second terminal coupled to the first signal node to limit an AC gain of an output stage.

5. The apparatus of claim 2, wherein the diode-connected transistor is operable to compensate for a pole movement during current demand change on the second power supply node.

6. The apparatus of claim 4, wherein the LDO-VR comprises:
a third p-type transistor with a source terminal coupled to the second power supply node; and
an amplifier or comparator to compare a reference with a divided down voltage on the second power supply node, wherein the amplifier or comparator have an output to control a gate terminal of the third p-type transistor.

7. The apparatus of claim 6, wherein the LDO-VR further comprises:
a first n-type transistor coupled in series with the first p-type transistor, wherein the first n-type transistor has a gate terminal controllable by a first bias voltage; and
a second n-type transistor coupled to a drain terminal of the third p-type transistor and the first n-type transistor, the second n-type transistor having a gate terminal controllable by a second bias voltage.

8. The apparatus of claim 7, wherein the
resistor has a first terminal to receive a third bias voltage, and a second terminal,
capacitor has a first terminal coupled to the second terminal of the resistor and the gate terminal of the first p-type transistor, and capacitor has a second terminal coupled to the first signal node which is coupled to the gate terminal of the power transistor via the multiplexer and the second terminal of the first p-type transistor.

9. The apparatus of claim 1, wherein the power transistor is a p-type transistor.

10. An apparatus comprising:
a power transistor to selectively operate as a digital power gate or as a linear analog driver of a low dropout voltage regulator (LDO-VR), wherein the LDO-VR is a flipped source follower; and
a first signal node coupled to a multiplexer to provide a first signal to control the power transistor to operate as the LDO-VR, wherein the power transistor is operable to receive a second signal on a second signal node to operate as the digital switch, wherein the LDO-VR comprises a capacitive multiplication compensation network that includes a capacitor coupled to the first signal node to selectively couple to the power transistor, and wherein the capacitive multiplication compensation network has a capacitance caused by capacitance multiplication effect.

11. The apparatus of claim 10, wherein the power transistor is a p-type transistor.

12. The apparatus of claim 10, wherein the LDO-VR comprises a diode-connected transistor to selectively couple to the power transistor.

13. The apparatus of claim 12, wherein the diode-connected transistor to stabilize the LDO-VR at high current loads.

14. The apparatus of claim 12, wherein the diode-connected transistor is a p-type transistor.

15. The apparatus of claim 12, wherein the capacitive multiplication compensation network is coupled to the diode-connected transistor to selectively couple to the power transistor.

16. The apparatus of claim 10, wherein the power transistor includes:
a gate terminal coupled to the multiplexer;
a source terminal coupled to a first power supply node; and
a drain terminal coupled to a second power supply node, the second power supply node for providing power to a load.

17. A system comprising:
a memory unit;
a processor coupled to the memory unit, the processor having an apparatus which comprises
a power transistor to selectively operate as a digital power gate or as a linear analog driver of a low dropout voltage regulator (LDO-VR), wherein the LDO-VR is a flipped source follower, and a first signal node coupled to a multiplexer to provide a first signal to control the power transistor to operate as the LDO-VR, wherein the power transistor is operable to receive a second signal on a second signal node to operate as the digital switch, wherein the LDO-VR comprises a capacitive multiplication compensation network that includes a capacitor coupled to the first signal node to selectively couple to the power transistor, and wherein the capacitive multiplication compensation network has a capacitance caused by capacitance multiplication effect; and
a wireless interface for communicatively coupling the processor to another device.

18. The system of claim 17 further comprises a display unit for displaying content processed by the processor.

* * * * *